United States Patent [19]

Minutillo

[11] Patent Number: 5,671,904
[45] Date of Patent: Sep. 30, 1997

[54] VALVE SAFETY HANDLE

[76] Inventor: Richard A. Minutillo, 289 Vagabond Dr., Port Orange, Fla. 32127

[21] Appl. No.: 711,060

[22] Filed: Sep. 9, 1996

[51] Int. Cl.⁶ .................................................. F16K 35/02
[52] U.S. Cl. ........................ 251/96; 16/121; 74/25; 74/548; 74/553; 74/554; 192/69.7; 192/69.9; 192/95; 251/77; 251/100; 251/229; 403/359
[58] Field of Search ........................ 251/95, 96, 100, 251/229, 230, 77; 16/121; 74/25, 111, 548, 552, 553, 554, 575; 192/66.1, 70.11, 95, 69.7, 69.71, 69.9, 69.91; 403/1, 359

[56] References Cited

U.S. PATENT DOCUMENTS

| | | | |
|---|---|---|---|
| 965,095 | 7/1910 | Filson | 251/96 |
| 1,801,175 | 4/1931 | Possons | 251/96 |
| 2,064,623 | 12/1936 | Mueller | 251/96 |
| 2,089,617 | 8/1937 | Mueller | 251/96 |
| 2,194,714 | 3/1940 | Mueller | 251/96 |
| 2,236,109 | 3/1941 | Mueller | 251/96 |
| 2,829,538 | 4/1958 | Mueller | 251/96 |
| 3,210,040 | 10/1965 | Thurlow | 251/96 |
| 4,480,784 | 11/1984 | Bennett | 236/93 B |
| 4,549,716 | 10/1985 | Warren | 251/96 |
| 5,152,314 | 10/1992 | Yandle, III | 137/382 |
| 5,217,201 | 6/1993 | Self | 251/90 |
| 5,263,853 | 11/1993 | Pall | 137/382 |
| 5,449,144 | 9/1995 | Kowalics | 251/99 |
| 5,513,831 | 5/1996 | Seward | 251/96 |
| 5,551,124 | 9/1996 | Zeringue | 251/96 |

*Primary Examiner*—George L. Walton
*Attorney, Agent, or Firm*—Paul S. Rooy

[57] ABSTRACT

A valve safety handle having a handle slidably attached to a valve stem. The handle incorporates a handle female spline sized to engage a valve stem male spline. The handle female spline is urged out of engagement with the valve stem male spline by means of a spring trapped between the handle and valve stem. The valve stem also has a valve stem key sized to slide into a handle lower recess keyway. Thus the handle may engage with the valve stem only after the handle has been rotated relative to the valve stem until the valve stem key aligns with the handle lower recess keyway, and the handle has then been translated relative to the valve stem against the spring until the handle female spline is engaged with the valve stem male spline. An alternate embodiment incorporates an adapter having an adapter female spline sized to engage a standard plumbing valve stem male spline. The adapter also incorporates an adapter male spline sized to engage the handle female spline, and an adapter key sized to fit into the handle lower recess keyway.

12 Claims, 4 Drawing Sheets

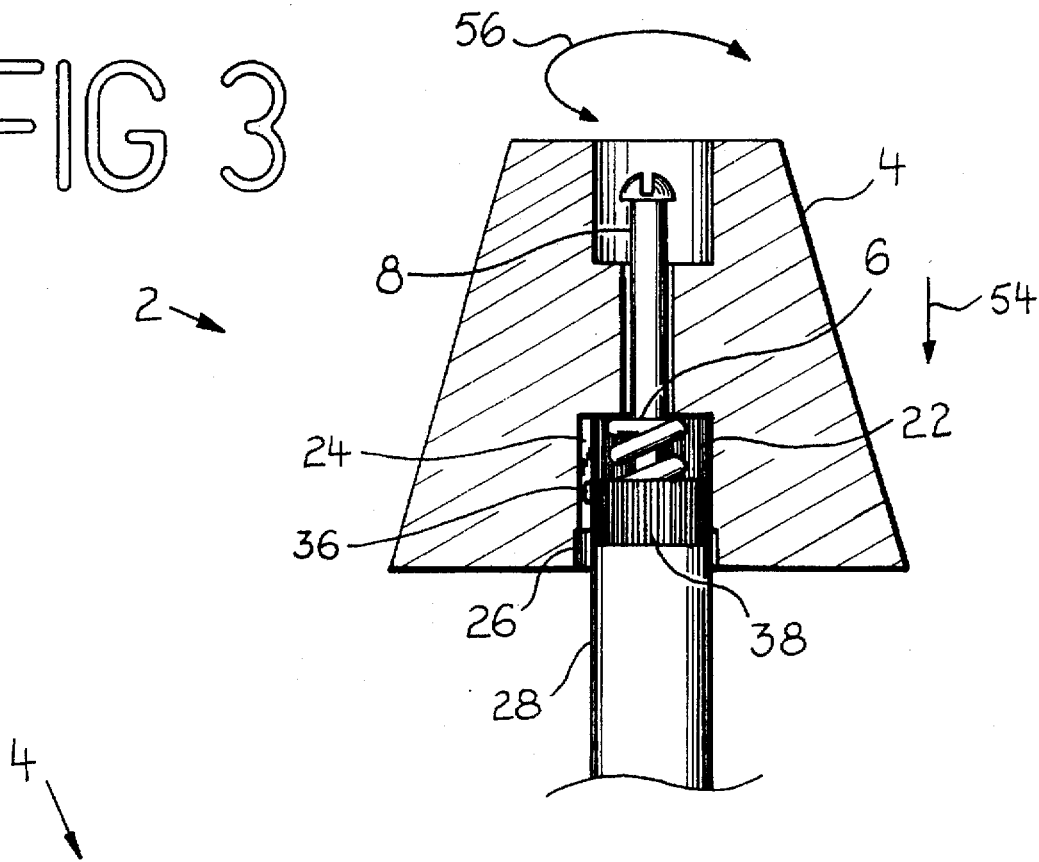
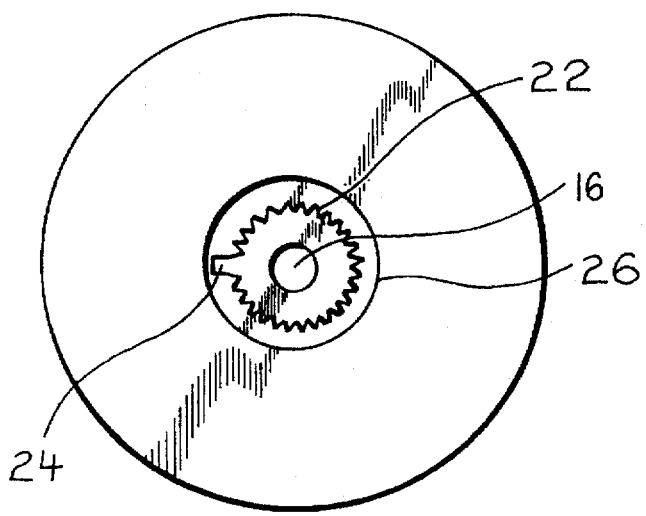

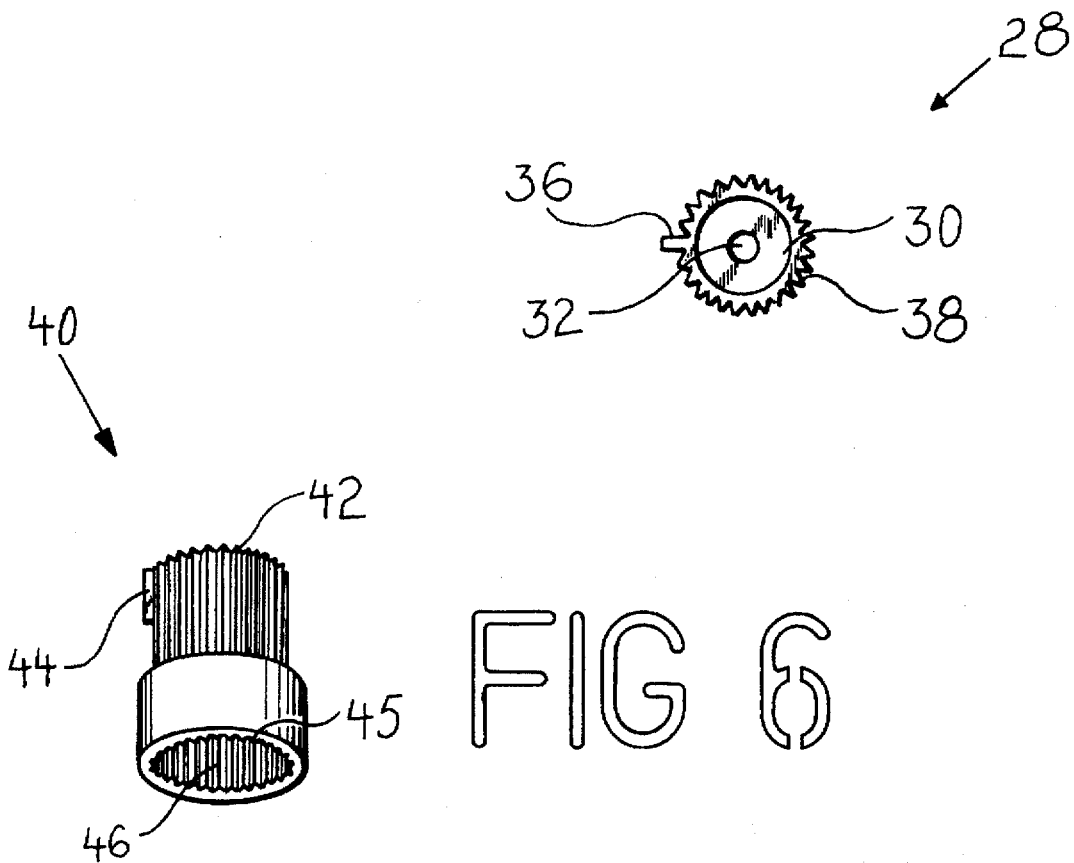
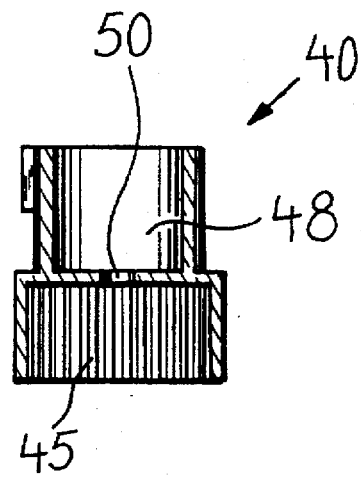

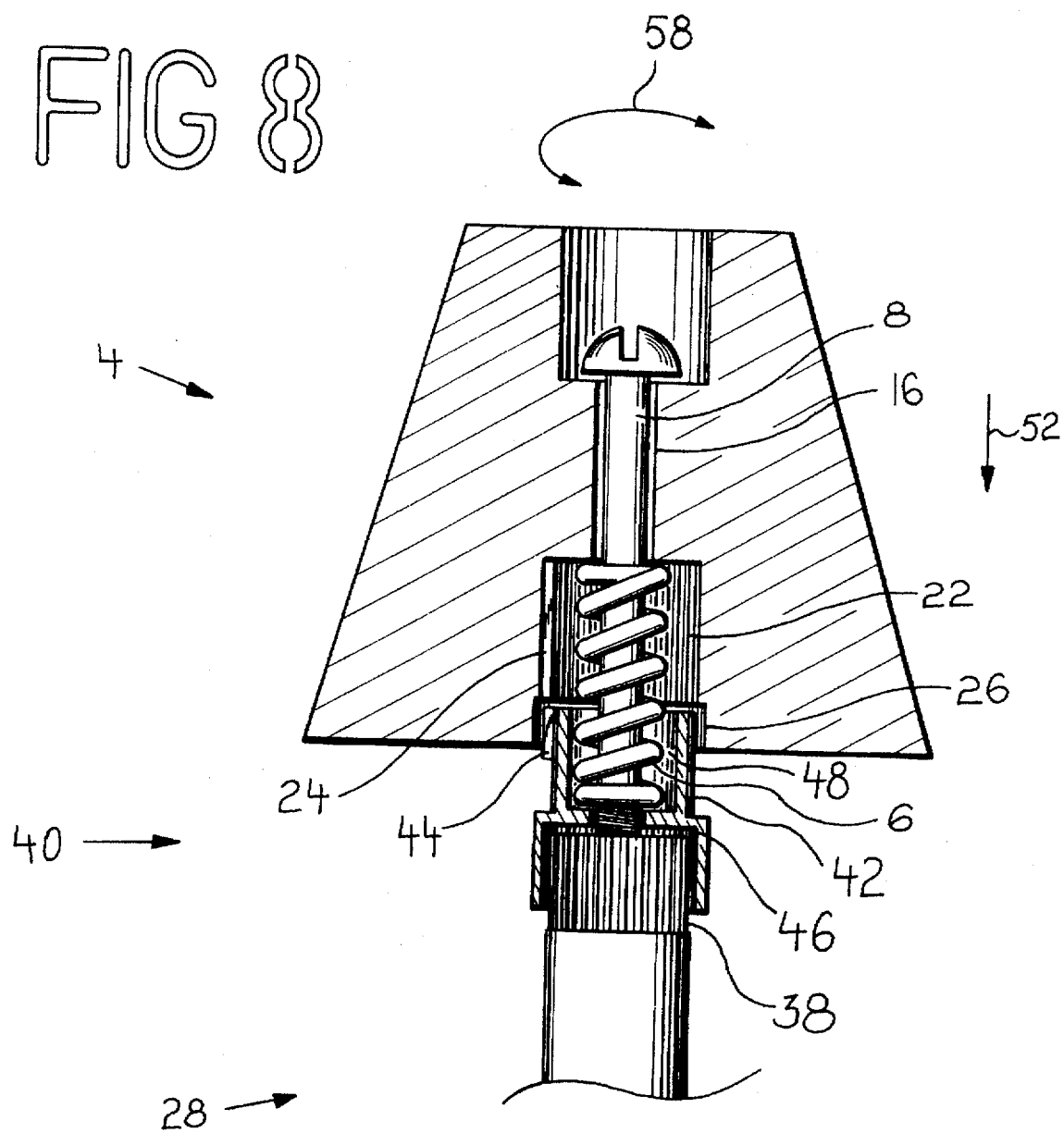

5,671,904

VALVE SAFETY HANDLE

BACKGROUND OF THE INVENTION

1. Field of the Invention

This invention relates to valve handles, and in particular to a valve safety handle.

2. Background of the Invention

One of the latent dangers inherent in modern water delivery systems is the possibility that a small child or other incompetent individual could inadvertently scald himself with hot water. This danger is especially pronounced where a young child over-opens a hot water faucet while taking a bath or washing at a sink. Due to the elevated hot water temperatures prevalent in most hot water systems, the victim could sustain severe burns.

3. Existing Designs

A number of solutions have been proposed to alleviate this problem. U.S. Pat. Nos. 5,263,853 and 5,152,314 were granted Pall and Yandle, III respectively for valve handle covers which prevented unauthorized access to valve handles unless the cover were first opened. One problem associated with these designs was the inherent bulkiness of valve cover assemblies external to the valve itself. Another problem was cumbersome valve operation, because the cover had to be removed before the valve could be operated.

Self was granted U.S. Pat. No. 5,217,201 for a Hot Water Faucet Safety Apparatus which included an extended hot water valve stem, spring legs, and a remote spring leg release handle attached to the spring legs by means of a string. Actuation of the valve required that the remote handle be held up with one hand and the valve handle rotated with another hand. One disadvantage associated with this design was a bulky installation because the extended valve stem extended further away from the wall than conventional designs. Another disadvantage was the cumbersome valve operation required by the design, because two hands were required.

Another approach to the problem was illustrated by U.S. Pat. No. 4,480,784 granted to Bennett. This design required the mounting of a thermostatic cup within a water supply pipe upstream of a shower nozzle. When the temperature of the water flowing through the water supply pipe exceeded a pre-set threshold, the thermostatic cup would expand its petals and shut off most of the water supply. While this design provided automatic operation, it precluded the supply of shower water under any circumstances above the threshold temperature. Also, although this feature protected children taking showers, it prohibited adults from using a shower water temperature above the threshold temperature. In addition, installation of the thermostatic cup required the removal of the shower nozzle.

SUMMARY OF THE INVENTION

Accordingly, it is an object of this invention to provide a valve safety handle which is normally in the non-engaged configuration. Design features enabling the accomplishment of this object include a spring urging a handle female spline out of engagement with a valve stem male spline. An advantage associated with the realization of this object is the prevention of scalding of minors and incompetent persons.

It is another object of the present invention to provide a valve safety handle which is simple and easy to operate. Design features allowing this object to be accomplished include a bolt attaching a handle to a valve stem, and a spring urging a handle female spline out of engagement with a valve stem male spline. Advantages associated with the accomplishment of this object include unencumbered and fast operation.

It is still another object of the present invention to provide a valve safety handle which will not operate the valve unless the handle is in the correct angular orientation relative to the valve stem. Design features allowing this object to be accomplished include a handle lower recess keyway sized to admit a valve stem key. A benefit associated with the accomplishment of this object is that minor or incompetent persons will experience difficulty aligning the valve stem key with the handle lower recess keyway, and thus be discouraged from operating the valve.

It is another object of the present invention to provide a valve safety handle which will not operate the valve unless the handle is translated relative to the valve stem against a spring in order to engage a handle female spline with a male spline disposed on the valve stem or on an adapter. Design features allowing this object to be accomplished include a handle female spline urged away from the valve stem by means of a spring. A benefit associated with the accomplishment of this object is that minor or incompetent persons will experience difficulty pushing the handle against the spring far enough to engage the splines, and then turning the handle, and thus will be discouraged from operating the valve.

It is another object of this invention to provide a valve safety handle whose installed dimensions are not significantly greater than those of a conventional installation. Design features enabling the accomplishment of this object include a handle incorporating a handle upper recess, handle bore, handle lower recess, and handle counterbore. An advantage associated with the realization of this object is a streamlined, compact installation.

It is yet another object of the present invention to provide a valve safety handle which may be installed on a conventional hot water faucet valve stem. Design features allowing this object to be accomplished include an adapter having an adapter lower recess with adapter female spline, an adapter upper recess, an adapter male spline, and an adapter bore. Benefits associated with the accomplishment of this object include quick and easy valve safety handle installation.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIGS. 1 and 2. Sheet two contains FIGS. 3 and 4. Sheet three contains FIGS. 5, 6 and 7. Sheet four contains FIG. 8.

FIG. 3 is a front cross-sectional view of a valve safety handle in the engaged configuration.
FIG. 4 is a bottom view of a handle.
FIG. 5 is a top view of a valve stem.
FIG. 6 is a is a front isometric view of an adapter.
FIG. 7 is a front cross-sectional view of an adapter.
FIG. 8 is a front cross-sectional view of a valve safety handle installed on a valve stem by means of an adapter, in the non-engaged configuration.

DETAILED DESCRIPTION OF THE PREFERRED EMBODIMENT

Figure 1:
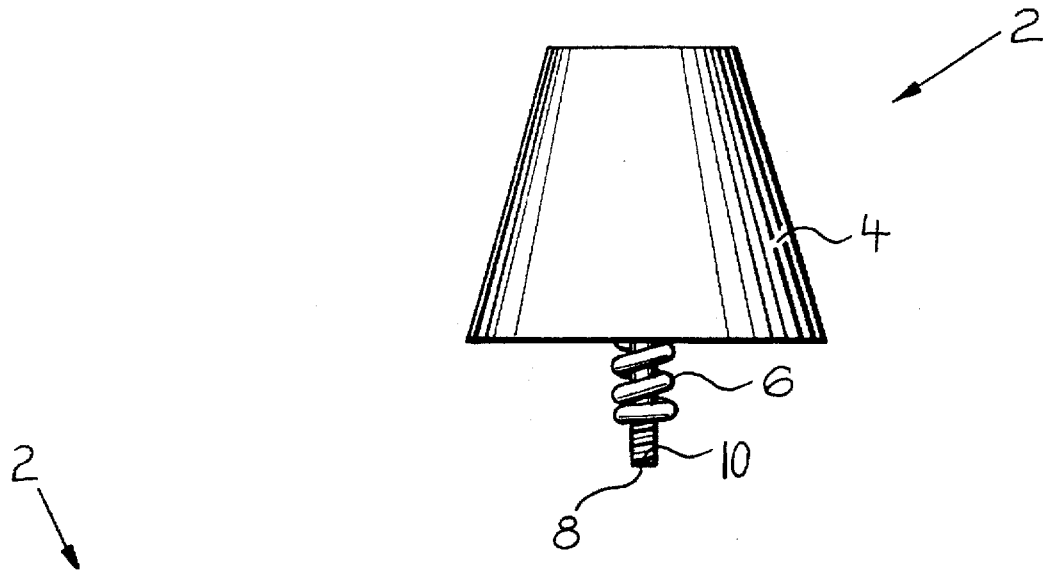
FIG. 1 is a front isometric view of a valve safety handle.
Figure 2:
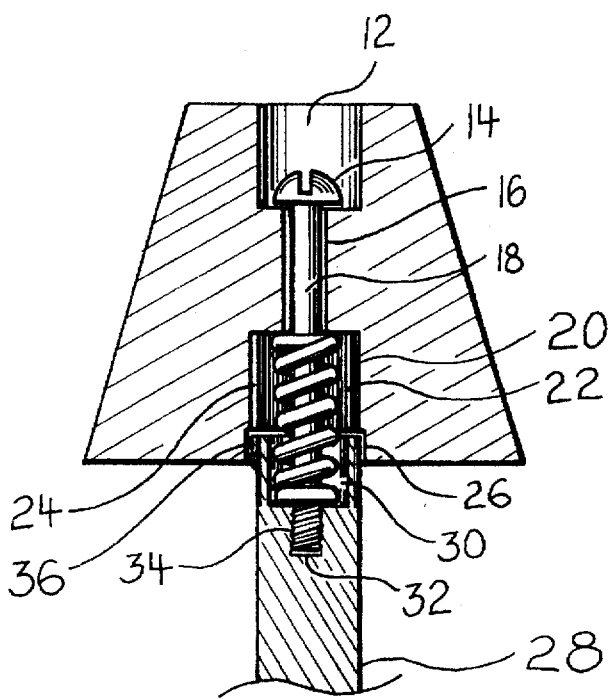
FIG. 2 is a front cross-sectional view of a valve safety handle in the non-engaged configuration.

FIG 1 is a front isometric view of valve safety handle 2.
FIG. 2 is a front cross-sectional view of valve safety handle 2 in the non-engaged configuration. Valve safety handle 2 comprises handle 4, bolt 8, spring 6 and valve stem 28. Bolt 8 comprises bolt head 14, bolt stem 18, and bolt thread 10.

Handle 4 comprises handle upper recess 12 sized to admit bolt head 14, handle bore 16 sized to admit bolt stem 18, handle lower recess 20 sized to admit spring 6, and handle counterbore 26 sized to rotationally admit valve stem 28. Handle upper recess 12 communicates with handle lower recess 20 and handle counterbore 26 through handle bore 16. Handle lower recess 20 comprises handle female spline 22 and handle lower recess keyway 24, as may also be observed in FIG. 4.

Referring now also to FIGS. 3 and 5, valve stem 28 comprises valve stem recess 30, valve stem male spline 38 and valve stem key 36. Valve stem recess 30 comprises valve stem bore 32 having valve stem female thread 34 sized to mate with bolt thread 10. Handle counterbore 26 is sized to freely admit valve stem male spline 38 and valve stem key 36, such that handle 4 is free to rotate relative to valve stem 28 about bolt 8.

Valve stem male spline 38 is sized to mate with handle female spline 22. Spring 6 urges handle female spline 22 out of engagement with valve stem male spline 38. Thus, in the disengaged configuration as illustrated in FIG. 2, the act of turning handle 4 will not affect the angular orientation of valve stem 28, because handle 4 will simply rotate relative to valve stem 28 about bolt 6, due to the fact that handle counterbore 26 is sized to rotationally admit valve stem male spline 38 and valve stem key 36.

FIG. 3 is a front cross-sectional view of valve safety handle 2 in the engaged configuration. In order to use handle 4 to drive valve stem 28, handle 4 must be translated relative to valve stem 28 and bolt 8 as indicated by arrow 54 in FIG. 3. As is depicted in FIG. 3, handle 4 has been translated relative to valve stem 28 and bolt 8 as indicated by arrow 54, so as to mate handle female spline 22 with valve stem male spline 38.

Note that in order to translate handle 4 as indicated by arrow 54, handle 4 must first be rotated relative to valve stem 28 as indicated by arrow 56 until handle lower recess keyway 24 aligns with valve stem key 36. Thus, valve safety handle 2 will not engage without first aligning handle lower recess keyway 24 with valve stem key 36. This prerequisite to engagement serves as an important safety feature, in that children and incompetent persons must first rotate handle 4 relative to valve stem 28 until handle lower recess keyway 24 aligns with valve stem key 36, and then push handle 4 against spring 6 until handle female spline 22 engages with valve stem male spline 38. Only then may handle 4 be used to turn valve stem 28.

FIGS. 6 through 8 depict an alternate embodiment of valve safety handle 2 which incorporates adapter 40, whereby valve safety handle 2 may be quickly and easily mounted to a standard hot water faucet valve stem 28. FIG. 6 is a is a front isometric view of adapter 40. Adapter 40 comprises adapter male spline 42 sized to engage handle female spline 22, and adapter key 44 sized to fit into handle lower recess keyway 24. Adapter 40 also comprises adapter lower recess 45 having adapter female spline 46 sized to engage valve stem male spline 38. Adapter 40 also comprises adapter upper recess 48 sized to admit spring 6. As is depicted in FIG. 7, adapter upper recess 48 communicates with adapter lower recess 45 through adapter bore 50, which is sized to admit bolt 8.

FIG. 8 is a cross-sectional view of handle 4 installed on valve stem 28 by means of adapter 40, in the non-engaged configuration. Bolt 8 traps spring 6 in compression between handle 4 and adapter 40. The pre-loaded condition of spring 6 urges adapter female spline 46 into engagement with valve stem male spline 38, and simultaneously urges handle female spline 22 out of engagement with adapter male spline 42.

Handle 4 is engaged with valve stem 28 by engaging handle female spline 22 with adapter male spline 42. This is accomplished by rotating handle 4 relative to valve stem 28 as indicated by arrow 58 until adapter key 44 aligns with handle lower recess keyway 24, and then pushing handle 4 against spring 6 as indicated by arrow 52 until handle female spline 22 engages adapter male spline 42. The requirement that adapter key 44 align with handle lower recess keyway 24 serves as an important safety feature, in that children and incompetent persons must first rotate handle 4 relative to valve stem 28 until handle lower recess keyway 24 aligns with adapter key 44, and then push handle 4 against spring 6 until handle female spline 22 engages with adapter male spline 42. Only then may handle 4 be used to turn valve stem 28.

While a preferred embodiment of the invention has been illustrated herein, it is to be understood that changes and variations may be made by those skilled in the art without departing from the spirit of the appending claims.

DRAWING ITEM INDEX 2 valve safety handle
4 handle
6 spring
8 bolt
10 bolt thread
12 handle upper recess
14 bolt head
16 handle bore
18 bolt stem
20 handle lower recess
22 handle female spline
24 handle lower recess keyway
26 handle counterbore
28 valve stem
30 valve stem recess
32 valve stem bore
34 valve stem female thread
36 valve stem key
38 valve stem male spline
40 adapter
42 adapter male spline
44 adapter key
45 adapter lower recess
46 adapter female spline
48 adapter upper recess
50 adapter bore
52 arrow
54 arrow
56 arrow
58 arrow

I claim:

1. A valve safety handle comprising a handle slidably and rotatably attached to a valve stem by means of a bolt, a plurality of valve stem male splines on one end of said valve stem, said handle comprising a handle lower recess communicating with a handle counterbore, a plurality of handle female splines in said handle lower recess sized to engage said valve stem male splines, a radially extending valve stem key disposed among said valve stem male splines, and a handle keyway disposed in said handle lower recess among said valve stem male splines, and a handle keyway disposed in said handle lower recess among said handle female splines, a diameter of said handle counterbore exceeding a diameter of said handle lower recess, whereby when said handle is disengaged from said valve stem said valve stem key is free to rotate within said handle counterbore, thereby preventing the unintentional opening of said valve, and whereby said splines may only be engaged when said handle is rotated to align said key with said keyway, and when said key is in said handle counterbore and not in alignment with said keyway, said splines cannot be cooperatively engaged by moving said handle to operate said valve thus providing an important safety feature to prevent the unintentional opening of said valve.

2. The valve safety handle of claim 1 further comprising a spring between said handle and said valve stem.

3. The valve safety handle of claim 2 wherein said handle lower recess is sized to admit said spring, and wherein said valve stem further comprises a valve stem recess sized to admit said spring.

4. The valve safety handle of claim 3 wherein said valve stem comprises a valve stem recess sized to admit said spring.

5. The valve safety handle of claim 4 wherein said valve stem further comprises a valve stem bore having a valve stem female thread sized to mate with a bolt thread.

6. The valve safety handle of claim 4 wherein said handle further comprises a handle upper recess sized to admit a bolt head.

7. A valve safety handle comprising a handle, an adapter and a means of slidably attaching said handle to said adapter, said adapter comprising a plurality of adapter male splines, said handle comprising a handle lower recess communicating with a handle counterbore a plurality of handle female splines in said handle lower recess sized to engage said adapter male splines a radially extending adapter key disposed among said adapter male splines, and a handle keyway disposed in said lower handle recess among said handle female splines, a diameter of said handle counterbore exceeding a diameter of said handle lower recess, whereby when said handle is disengaged form said adapter said adapter key is free to rotate within said handle counterbore thereby preventing the unintentional opening of said valve, and whereby said splines may only be engaged when said handle is rotated to align said key with said keyway, and when said key is in said handle counterbore and not in alignment with said keyway said splines cannot be cooperatively engaged by moving said handle to operate said valve, thus providing an important safety feature to prevent the unintentional opening of said valve.

8. The valve safety handle of claim 7 further comprising a spring trapped between said handle and said adapter.

9. The valve safety handle of claim 8 wherein said means of slidably attaching said handle to said adapter comprises a bolt through a handle bore and through an adapter bore, said handle bore and said adapter bore being sized to slidably admit said bolt.

10. The valve safety handle of claim 9 wherein said handle further comprises a handle upper recess sized to admit a bolt head, and wherein said handle lower recess is sized to admit said spring.

11. The valve safety handle of claim 10 wherein said adapter female spline is sized to engage a standard hot water faucet valve stem male spline.

12. The valve safety handle of claim 9 wherein said adapter further comprises an adapter upper recess sized to admit said spring.

* * * * *